(12) United States Patent
Waggoner

(10) Patent No.: US 11,498,005 B1
(45) Date of Patent: Nov. 15, 2022

(54) GEOMETRY-AWARE ENCODING OF 2D ELEMENTS

(71) Applicant: Amazon Technologies, Inc., Seattle, WA (US)

(72) Inventor: Charles Benjamin Waggoner, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 232 days.

(21) Appl. No.: 16/916,477

(22) Filed: Jun. 30, 2020

(51) Int. Cl.
*A63F 13/58* (2014.01)
*G06T 15/04* (2011.01)
*G06T 17/20* (2006.01)

(52) U.S. Cl.
CPC .............. *A63F 13/58* (2014.09); *G06T 15/04* (2013.01); *G06T 17/20* (2013.01); *G06T 2210/36* (2013.01)

(58) Field of Classification Search
CPC ......... A63F 13/58; G06T 15/04; G06T 17/20; G06T 2210/36
See application file for complete search history.

(56) References Cited

U.S. PATENT DOCUMENTS

| 2013/0265382 | A1* | 10/2013 | Guleryuz | G06T 11/60 348/14.08 |
| 2016/0110917 | A1* | 4/2016 | Iverson | G06T 17/205 345/420 |
| 2019/0213778 | A1* | 7/2019 | Du | G06T 17/00 |
| 2020/0265611 | A1* | 8/2020 | Hemmer | G06T 17/205 |

OTHER PUBLICATIONS

Huang, Yinghao, et al. "Towards accurate marker-less human shape and pose estimation over time." 2017 international conference on 3D vision (3DV). IEEE, 2017. (Year: 2017).*

* cited by examiner

*Primary Examiner* — Daniel F Hajnik
(74) *Attorney, Agent, or Firm* — Kilpatrick Townsend & Stockton LLP

(57) ABSTRACT

Techniques for a texture modification feature are described herein. First data identifying a position and a distance of an actor in an environment from a view point is obtained. The actor may correspond to a mesh comprised of a plurality of triangles. Second data identifying a location, an angle, and size for each triangle of the plurality of triangles with respect to a spectrum of pre-defined viewpoints is obtained. A value for each triangle may be determined based on the first data and the second data. The value may represent a level of detail to optimize viewing of each triangle of the actor from a corresponding viewpoint of the spectrum of pre-defined viewpoints. One or more areas of a texture that corresponds to the mesh may be modified prior to applying the texture to the mesh based on the associated values for triangles of the mesh.

18 Claims, 8 Drawing Sheets

US 11,498,005 B1

GEOMETRY-AWARE ENCODING OF 2D ELEMENTS

BACKGROUND

Users can enjoy a variety of media such as video games and streaming content using a plethora of user devices (e.g., video game consoles, portable tablet computers, etc.). Media content providers must ensure that their content is provided to users quickly and reliably. However, optimally transforming, compressing, or otherwise altering content to prioritize speed can result in lower quality content that can reduce the enjoyment of the content by the users as well as injure the goodwill generated by the media content provider. Conventional optimization methods may not account for transformations that occur between two dimensional (2D) objects and three dimensional (3D) objects and thus generate content that includes several unneeded artifacts that reduce overall quality of the media content.

BRIEF DESCRIPTION OF THE DRAWINGS

Various embodiments in accordance with the present disclosure will be described with reference to the drawings, in which.

DETAILED DESCRIPTION

Figure 1:
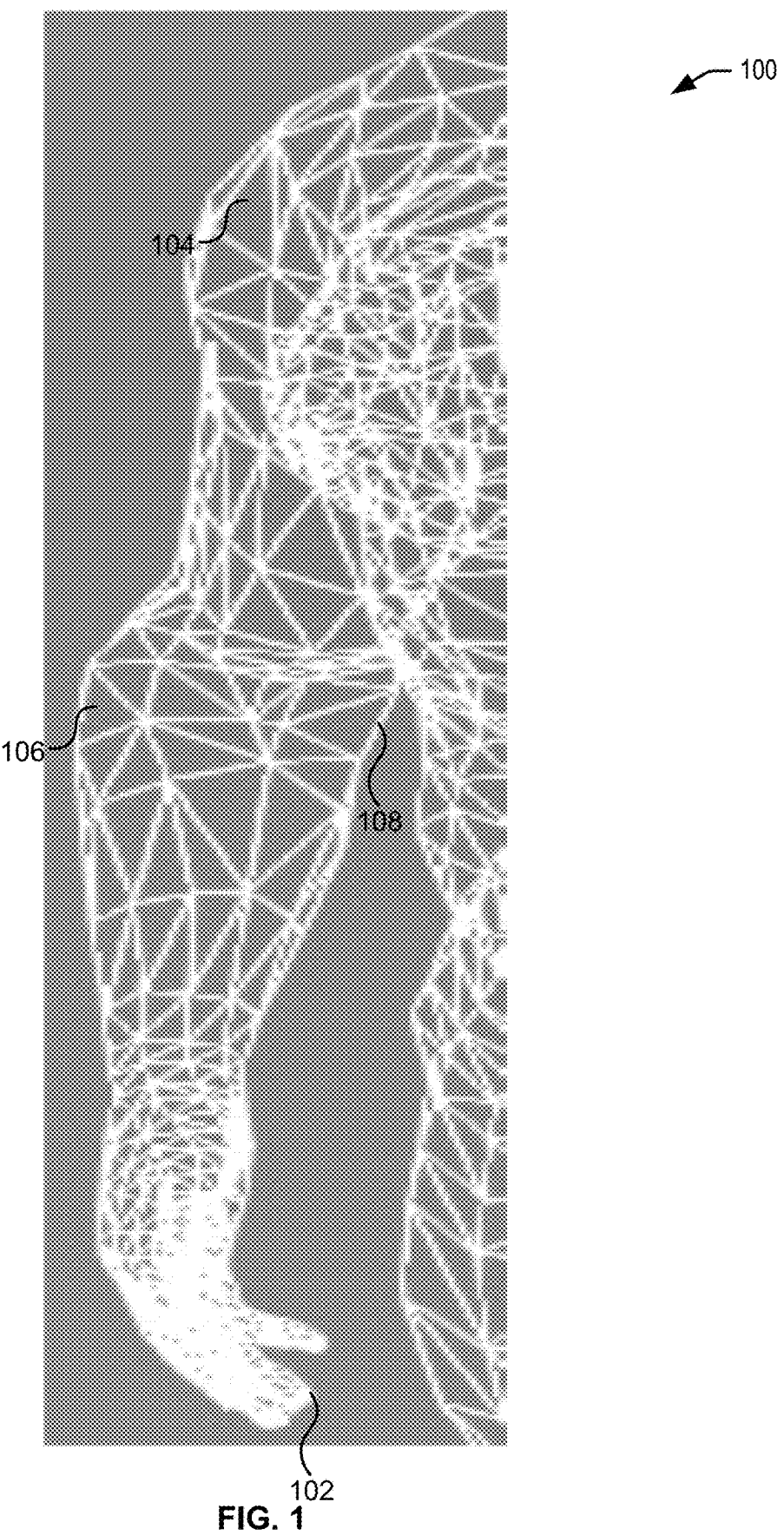
FIG. 1 illustrates an example of a 3D mesh object comprising a plurality of triangles which may be utilized by a texture modification feature, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for implementing a texture modification feature for optimizing a level of detail for a rendered texture and mesh in an environment. To render an object (actor) in an environment such as a video game, animation, or movie a texture (a two dimensional (2D) object) may be transformed in a planar space to a mesh (a three (3D) object) in the environment. The mesh may be a complex irregular shape comprised of a plurality of triangles, each with varying sizes, dimensions, and angles with reference to other triangles of the mesh. Textures may be scaled and stretched so that the triangles of the mesh correlate to areas of the mesh to generate a rendered object. The texture modification feature described herein may increase or decrease detail and sharpness of a texture in cases where areas of the textures are required to be bigger or smaller proportionally to their areas of the texture relative to their location on the mesh. By increasing or decreasing detail and sharpness of certain areas of the texture prior to transforming the texture to the mesh a consistent level of detail in a final rendered object (texture and mesh) may be achieved which can reduce or eliminate aliasing artifacts resulting from large scaling ratios.

Objects in an environment may be captured or viewed from a pre-defined spectrum of viewpoints within the environment (e.g., camera angles, camera distance). For example, a video game character may only be presented, to the viewpoint of a user playing the video game, at certain angles and distances such that portions of the video game character are rarely viewed by the user. In embodiments, a computer system implementing the texture modification feature may receive or obtain data identifying sizes, locations, angles captured by a view point of the spectrum of viewpoints, and distances to each triangle of a plurality of triangles of a mesh for an object in an environment. Other data about how the plurality of triangles of the mesh for an object interact with the environment, lighting, contrast, and shadows may also be obtained or received by a computer system. This data may be used to determine that certain triangles of the mesh can be provided with less detail than other triangles of the mesh given how the object is captured or viewed in the environment as it interacts with the environment. Corresponding areas of the texture that will be applied to the mesh can be modified such as by identifying higher frequency areas that do not require as much detail given how the area will eventually be viewed or not viewed at all.

In embodiments, the computer system may use the data for the meshes and textures to generate a value for each triangle of the plurality of triangles that make up a mesh. A value for a triangle may represent an overall detail level required to present a consistent and optimized presentation of the triangles of the mesh. For example, a lower value may represent that an area of the texture that corresponds to a particular triangle of the plurality of triangles for the mesh can be more compressed or have its encoding parameters modified to result in a less detailed presentation for the particular triangle when the texture is applied to the mesh. In comparison, a higher value for a triangle may represent that the corresponding area of texture should not be compressed or modified as much if at all to preserve detail as the area of texture and correlated mesh of the object may be presented more than other respective areas of the object. In embodiments, one or more values may be determined for each triangle of the plurality of triangles that make up a mesh. Each value for a triangle may correspond to a different axis of the triangle and represent the amount of detail to be preserved or decreased based on the ultimate geographic transformation for the mesh and triangle when rendering the 3D object. For example, a narrow triangle may take up more space on one axis compared to the other axis of the same triangle. In such cases the values may be different to represent the detail to be preserved for the larger portion of the triangle (e.g., the height of a tall but narrow triangle) whereas the smaller portion of the same triangle may not have as much detail preserved (e.g., the width of the tall but narrow triangle).

In some video coding formats or video compression formats, an encoding process includes determining residual coefficients representing differences in image content between a portion (a block of pixels as a coding unit representing an encoding region) of a target image frame to be encoded and corresponding portions of reference image frames. A quantization parameter (QP) can be applied to the residual coefficients to reduce their values as a compression technique. In accordance with at least one embodiment, the data may be used by the computer system implementing the texture modification feature to train a machine learning algorithm to identify and generate the values for the triangles. The values may be dynamically updated as the mesh is modified or the environment is modified such that certain triangles may be viewed more or with greater detail than in previous iterations of the mesh and texture. In embodiments, one or more filters may be designed to modify the texture based on the values determined for corresponding triangles of the mesh. The one or more filters may be configured to reduce the sharpness or detail of a texture by reducing frequencies present in the area of the texture such as by applying a low pass filter which removes high frequency content from certain areas of the texture. Other filters such as a high pass filter or sharpening filter can be applied to the texture to modify certain areas of the texture to enhance edges present in the portion of the texture or remove background information thereby increasing the detail of the texture that will subsequently be applied to the mesh during rendering.

Techniques described herein for the texture modification feature may result in a number of technical advantages for rendering data objects. For example, conventional techniques may only consider the characteristics of a texture in a vacuum (i.e., without considering the transformations that need to take place in order to be applied to a 3D object (mesh)). Moreover, data about how the mesh of an object interacts with an environment and the specific data for each triangle of the mesh (size, captured angle and distance from a viewpoint, lighting, etc.) may not be considered by conventional rendering techniques. The texture modification feature described herein can capture such data for meshes and modify textures such that the final rendered object (texture and mesh) are optimized to present a consistent level of detail while taking into account presentation distances and angles for the object as it interacts within an environment. By reducing detail in certain areas of a texture that do not need as much detail file sizes can be reduced and compression techniques can be performed more efficiently. Moreover, reduced file sizes result in faster transmission times of content from convent providers to user devices. The texture modification features can also be applied dynamically. For example, as designers or content creators update meshes and textures for an object the techniques described herein can be used to update the values for the triangles and further modify correlated areas of the texture to optimize presentation of the updated meshes and texture in an environment.

FIG. 1 illustrates an example of a 3D mesh object 100 comprising a plurality of triangles which may be utilized by a texture modification feature, in accordance with embodiments. As depicted in FIG. 1, the 3D mesh object 100 may include a plurality of triangles 102, 104, 106, and 108. The 3D mesh object 100 presented via FIG. 1 may correspond to a portion of mesh for a human. The 3D mesh object 100 may be configured to interact with an environment, such as an environment implemented by a game engine, in which the 3D mesh object 100 may perform a number of actions. As the 3D mesh object 100 interacts with the environment and performs actions, certain triangles of the plurality of triangles 102, 104, 106, and 108 may be viewed or captured from a spectrum of viewpoints at particular angles and distances. The particular angles and distances at which the certain triangles are captured by a game engine, along with the size of each triangle (e.g., triangles 102, 104, 106, and 108) may be used by a computer system to determine that certain triangles are viewed or presented more during the movement of the 3D mesh object 100 to a viewer via the spectrum of viewpoints.

For example, triangles 102 and 104 may consistently, throughout the actions performed by the 3D mesh object 100, be presented at a proximal distance from viewpoints of the spectrum of viewpoints and at certain angles which indicate that triangles 102 and 104 will be viewed more often and more closely than other triangles. To continue the example, triangles 106 and 108 which may correspond to portions near the side and back of the elbow of the arm of 3D mesh object 100, may not be presented in as a great a detail or as often via the spectrum of viewpoints throughout the actions performed in the environment. As described herein, a computer system implementing the texture modification feature may obtain or receive data for each triangle of the plurality of triangles (e.g., 102-108) as the 3D mesh object 100 interacts with the environment. The data can include the size of each triangle, the distance of each triangle from the spectrum of viewpoints, the angles at which each triangle is captured from the spectrum of viewpoints, lighting conditions and shadows for each triangle as the 3D mesh object 100 interacts with the environment, and other suitable data.

In embodiments, the data captured for the plurality of triangles 102-108 along with information about the areas of the texture that correspond to the plurality of triangles 102-108 may be used to generate a value for each triangle of the plurality of triangles 102-108 for 3D mesh object 100. The values may represent a level of detail to optimize presentation for each triangle for the 3D mesh object 100 based on the data captured about the triangles as the 3D mesh object 100 performs actions and/or interacts with the environment. For example, if the data indicates that triangles 106 and 108 are rarely if at all presented to a viewer based on the spectrum of viewpoints at which the 3D mesh object 100 is captured while performing actions or interacting with the environment, then the values may represent that less detail is required to render corresponding texture for triangles 106 and 108. As another illustrative example, if triangles 102 and 104 are presented more often, with respect to other triangles of 3D mesh object 100, and at a closer distance by the spectrum of viewpoints as the 3D mesh object performs actions or interacts with the environment, then the values for triangles 106 and 108 may represent that more detail is required to render corresponding texture for triangles 102 and 104.

As described in the figures below, other information such as how the texture is scaled or stretched as it is applied to the 3D mesh object 100 may also be used to modify or weight the values determined by the computer system implementing the texture modification feature. Values may be weighted to preserve fidelity of less occluded areas of the 3D mesh object 100 and to preserve detail for larger triangles of the 3D mesh object. In embodiments, the determined values for the triangles 102-108 may be used to modify corresponding areas of a texture prior to applying the texture such as by applying a low pass filter to remove high frequency content from the corresponding areas and reduce detail. Encoding parameters for the corresponding areas of the texture may also be determined which result in different levels of compression being utilized for certain areas of the texture as opposed to other areas of the texture. For example, some areas that correspond to areas which require less detail, as indicated by the values, may be compressed using a lossy compression technique while other areas which require more detail, as indicated by the values, may be compressed using lossless compression techniques.

Figure 2:
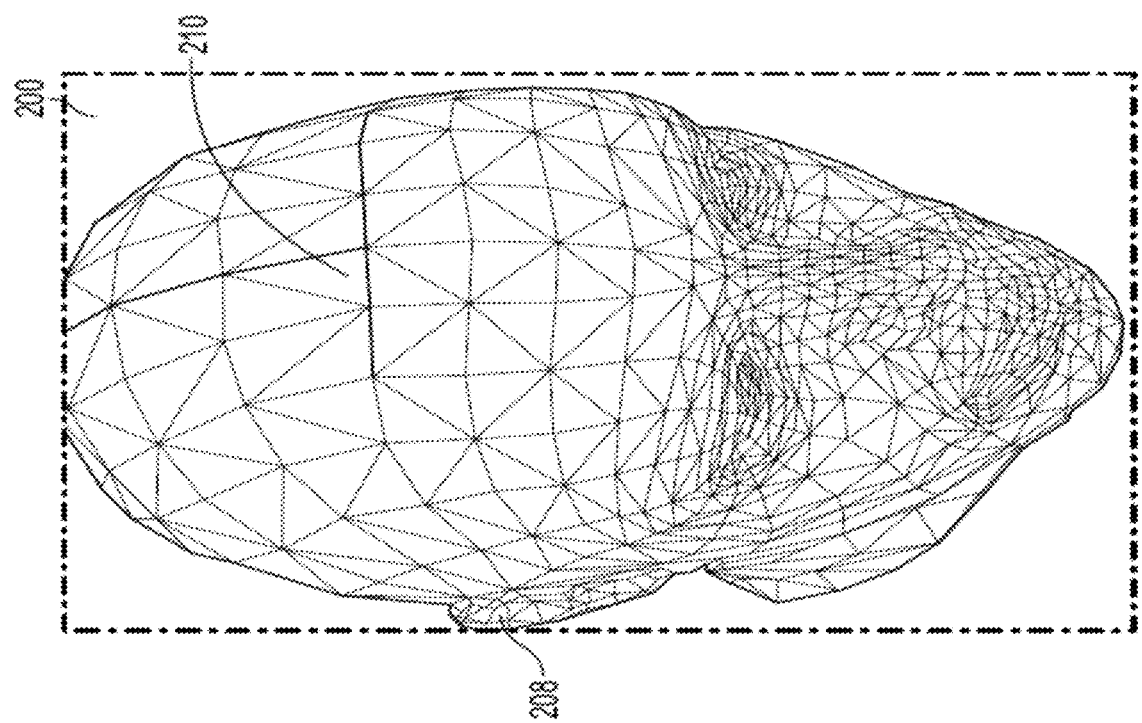
FIG. 2 illustrates an example of a 3D mesh object comprising a plurality of triangles and a 2D texture with one or more portions that correspond to the plurality of triangles of the 3D mesh object which may be utilized by the texture modification feature, in accordance with embodiments.
Figure 2:
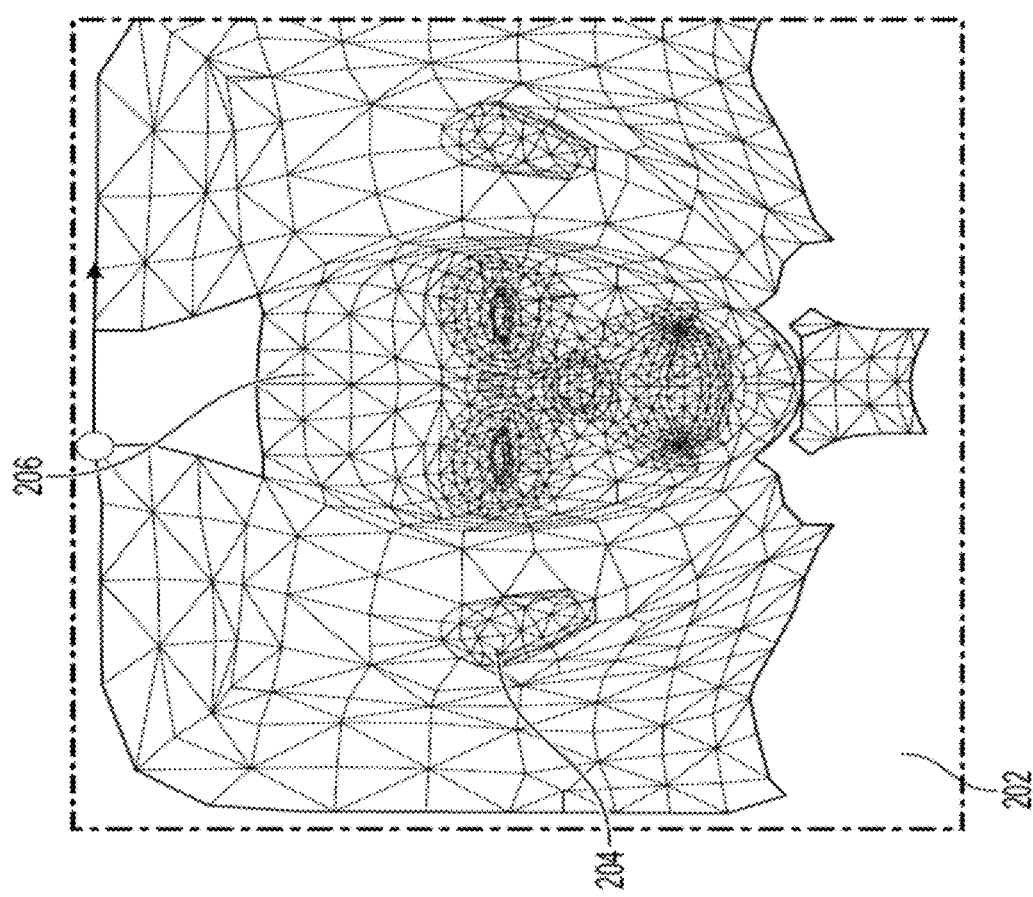

FIG. 2 illustrates an example of a 3D mesh object 200 comprising a plurality of triangles and a 2D texture 202 with one or more portions (areas) that correspond to the plurality of triangles of the 3D mesh object 200 which may be utilized by the texture modification feature, in accordance with embodiments. As described herein, to render an object that includes 3D mesh object 200 and texture 202, the texture 202 which exists as a 2D object in a planar space, may be transformed to the 3D mesh object in an environment such as a game engine or an animation engine. FIG. 2 includes one or more areas 204, 206 on 2D texture 202 which correlate, respectively, to particular triangles 208 and 210 of the 3D mesh object 200. As depicted in FIG. 2, triangle 210 of the 3D mesh object 200 may be more visible from a top down view and a determined value for triangle 210 may represent that the triangle 210 and corresponding area 206 of 2D texture 202 should be provided with more detail. Although the triangles 208 and 210 of the 3D mesh object 200 may be represented as to scale for areas 204 and 206 on 2D texture 202, it should be noted that the texture modification feature described herein accounts for preserving detail in textures for corresponding larger triangles of a 3D mesh.

In embodiments, data about the 2D texture 202 and the particulars of the transformation of the 2D texture 202 to the 3D mesh object 200 may be obtained and utilized when determining the values for triangles 208 and 210. For example, during transformation of the 2D texture 202 to the 3D mesh object 200, the areas 204 and 206 may be changed in size (scaled larger or smaller) or stretched/warped in some fashion with respect to the triangles 208 and 210. For example, a given texture area of 2D texture 202 may be stretched more near the poles of 3D mesh object 200 as opposed to more smooth or less complex flat areas of the 3D mesh object 200. In some embodiments, the areas of the 2D texture 202 may be scaled up or down to correlate to the appropriate triangle of the 3D mesh object 200. For example, area 204 of 2D texture 202 may be scaled to a larger size to properly transform to triangle 208 of 3D mesh object 200.

However, as described herein, data about the 3D mesh object 200 may indicate that the triangle 208 is not viewed from the spectrum of viewpoints which capture and present 3D mesh object 200 in an environment. In such cases, the conventional technique of scaling the area 204 of 2D texture 202 to cover the triangle 208 of 3D mesh object 200 may result in maintaining detail that is not required to optimize rendering of the 3D mesh object 200 and 2D texture 202. To further illustrate the example, the texture modification feature described herein could determine a value for triangle 208 of 3D mesh object 200 which is utilized to modify the area 204 of 2D texture 202 to remove details to optimize rendering of the 2D texture 202 and 3D mesh object 200. For example, area 204 may be compressed via a lossy compression technique implemented to reduce the level of detail of the 2D texture 202 for area 204 and ultimately for triangle 208 as it is applied to 3D mesh object 200.

The texture modification feature described herein may utilize certain scaling algorithms such as a bi-linear scaling algorithm or nearest neighbor scaling algorithm to reduce aliasing in rendered objects. Certain features of the 2D texture 202 which correspond to an area that requires less detail (e.g., area 204) that are smoothed out via a low pass filter are more efficiently scaled according to scaling algorithms and thus reduce aliasing in rendered objects. For areas that will be more visible according to the data, such as area 206 and triangle 210, a high pass filter may be utilized to maintain detail and even if the scaling results in the texture 206 being scaled down to fit triangle 210. In such cases, the level of detail is deemed appropriate as the resultant rendered object of 2D texture 202 and 3D mesh object 200 may present area 206 and triangle 210 to the spectrum of viewpoints with greater frequency and a closer distance such that detail is required to be maintained or increased to optimize rendering.

In accordance with at least one embodiment, the data for triangles of a mesh, such as data for triangles 208 and 210 may be used to train a machine learning algorithm to generate the values for a plurality of triangles for a mesh. A computer system configured to implement the texture modification features described herein may be configured to use the trained machine learning algorithm to generate the values for the triangles of a mesh based on the data about the triangles, the corresponding areas of the texture, environmental data, or other data. In embodiments, the values for the triangles, such as triangles 208 and 210, may dynamically be updated based on changes to the structure or features of mesh 200. For example, the mesh 200 may be updated to include additional features (e.g., hair or facial hair) which results in changes to the size, scale, geometry, angles, or presentation of triangles 208 and 210 for mesh 200 as it is captured or presented via a spectrum of viewpoints. Such updates to the mesh 200 may result in updates to the values for triangles 208 and 210 to optimize the level of detail and maintain consistency for the level of detail of a rendered object that includes mesh 200 and texture 202.

Figure 3:
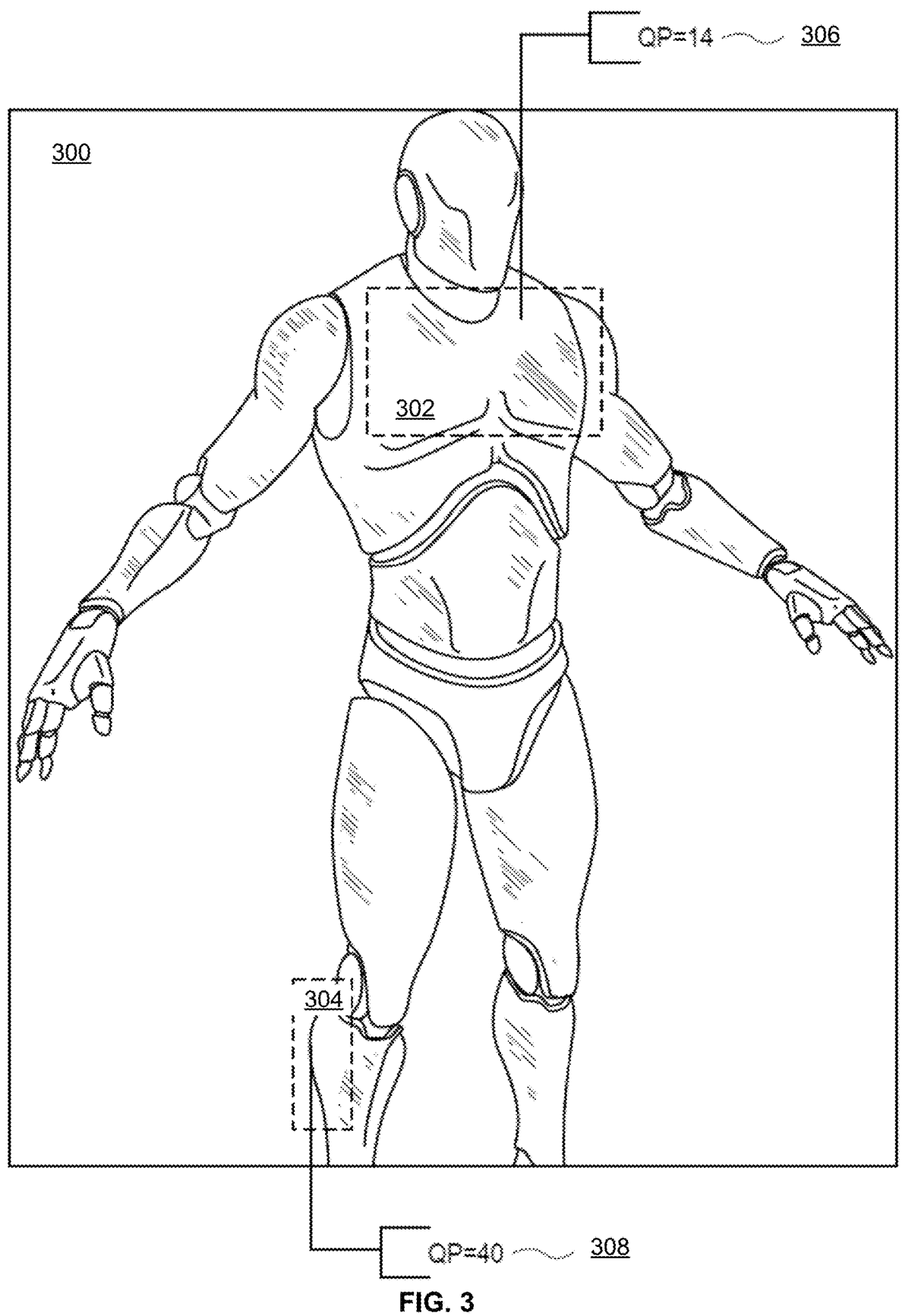
FIG. 3 illustrates an example of encoding media content with the texture modification feature using information about a 2D texture and a mesh of a 3D object, in accordance with embodiments.

FIG. 3 illustrates an example of encoding media content with the texture modification feature using information about a 2D texture 300 and a mesh of a 3D object, in accordance with embodiments. FIG. 3 depicts a 2D texture 300 that may correlate to a mesh which when rendered together make an object in an environment. The 2D texture 300 may exist in a 2D planar space. In embodiments, the 2D texture 300 may be transformed onto or into a 3D object such as a mesh in an environment such as a gaming engine or animation engine. As the 2D texture 300 may exist in a 2D plane, its transformation to a 3D object in a 3D space may result in deformation of its various portions. The 2D texture 300 includes a portions (areas) 302 and 304. In the 2D plane, the portions 302 and 304 may be similar in size. However, depending on their corresponding triangles of the mesh object, the areas 302 and 304 may be deformed and result in different sizes due to the manipulations needed to transform the 2D texture 300 onto the 3D mesh object in a 3D environment. In embodiments, transforming the 2D texture 300 to the 3D mesh object may involve a decoder stretching the 2D texture in some areas (e.g., 302 and 304) or warping, reorienting, changing scale, etc., the 2D texture in areas 302 and 304 to transform to the corresponding triangles of the 3D mesh object.

The corresponding triangles of the 3D mesh object may have different pixel densities (i.e., the number of pixels from the 2D texture 300 for the corresponding triangle of the 3D mesh object that they are transformed to occupy) despite the 2D texture 300 portions 302 and 304 being of a similar size in the planar space. This can happen because portions 302 and 304 of 2D texture 300 may be stretched or manipulated more near the edges, curves, or complex shapes of the 3D mesh object as opposed to less complex central surfaces and shapes of the 3D mesh object. In embodiments, an encoding process for media (content) includes determining residual coefficients representing differences between the 2D texture 300 and portions 302 and 304 as a target 2D texture frame and corresponding portions of reference 2D texture frames as they are applied, transformed, and changed to a 3D mesh object. A quantization parameter can be applied to the residual coefficients to reduce their values as a compression technique (e.g., divide the values of the residual coefficients by the quantization parameter). As illustrated in FIG. 3, different quantization parameters can be applied to different portions of the 2D texture 300. In accordance with at least one embodiment, the quantization parameters may be determined based on data about the 2D texture 300, the corresponding triangles of the 3D mesh object, and the environment that the rendered object that includes the 2D texture 300 and triangles of the 3D mesh object.

Portions of 2D texture 300 that are larger might correspond to a smaller quantization parameter than a smaller portion of 2D texture 300 so that the larger portions can be compressed less and therefore preserve more visual detail. Also, portions of 2D texture 300 that include more detail, textures, or different types of geometry such as portion 302, might be associated with a lower quantization parameter (QP) to preserve the details better when the 2D texture 300 is applied to the 3D mesh object. As depicted in FIG. 3, the QP 306 for portion 302 is less than the QP 308 for portion 304. This can result in less compression or preserving more detail for portion 302 during a transformation to the 3D mesh object and more compression and not preserving as much detail for portion 304 during a transformation to the 3D mesh object. The computer system configured to implement the texture modification feature may determine the QPs 306 and 308 for portions 302 and 304 based on the data obtained about the texture, the triangles of the 3D mesh object, or other data about the environment for the subsequent rendered object such as lighting, shadows, and color contrast.

Figure 4:
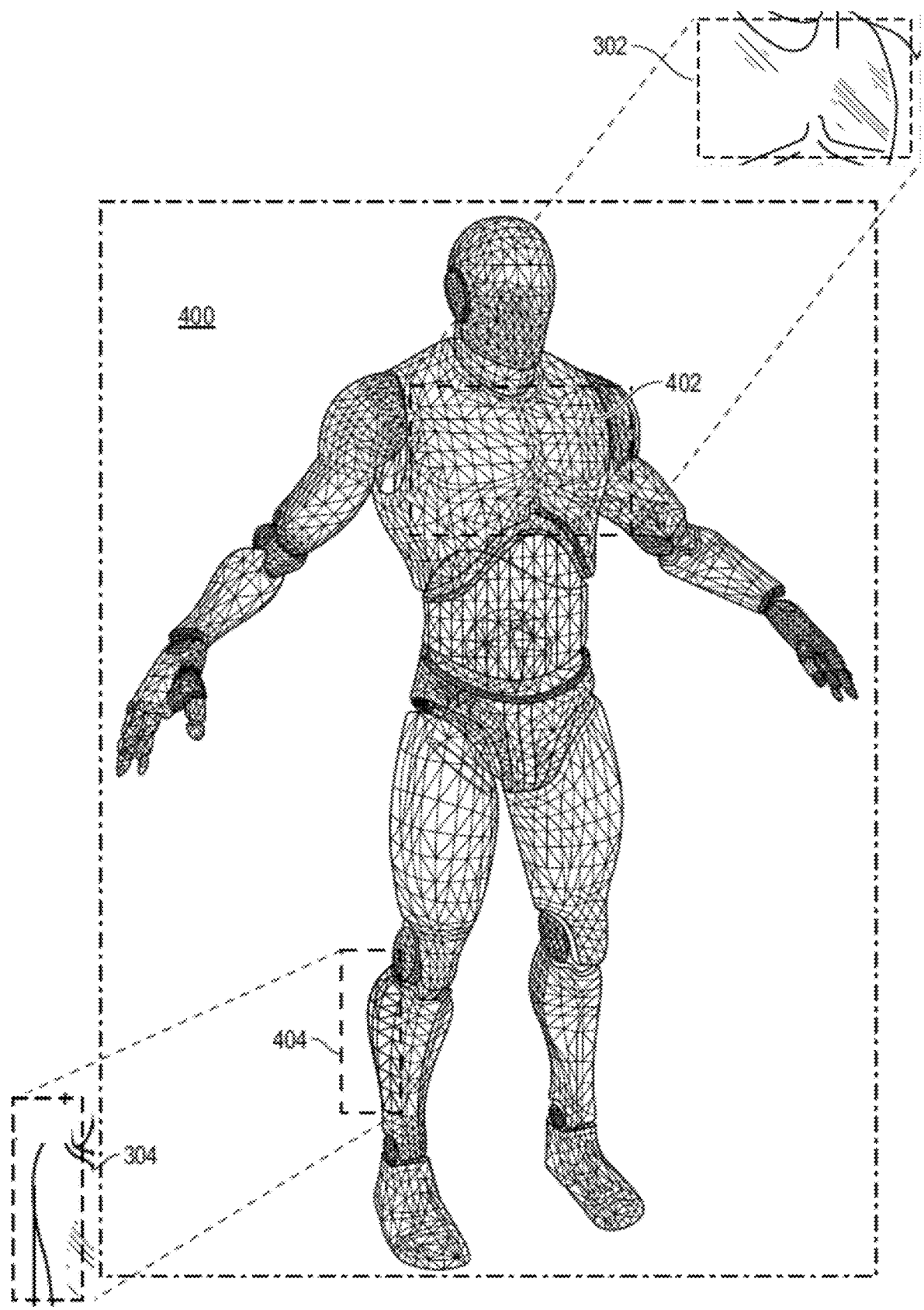
FIG. 4 illustrates an example of encoding media content with the texture modification feature using information about a 2D texture and a mesh of a 3D object, in accordance with embodiments.

FIG. 4 illustrates an example of encoding media content with the texture modification feature using information about a 2D texture and a mesh 400 of a 3D object, in accordance with embodiments. The mesh 400 of the 3D object can correspond to the 3D mesh object described in FIG. 3. The portions 302 and 304 of 2D texture 300 may correlate to the triangles of 402 and 404, respectively, for mesh 400 of the 3D object. As described herein, the encoding parameters which may include quantization parameters (e.g., 306 and 308) may result in different compression being applied to different portions of the 2D texture 300 as it is applied to the mesh 400 of the 3D object. The determination of the encoding parameters can be based on data about the plurality of triangles for 402 and 404.

For example, the plurality of triangles for 404 of the mesh 400 may correspond to triangles that are rarely seen by a view point of a spectrum of viewpoints as the 3D object of the mesh 400 performs actions or interacts with an environment. As such, details for corresponding areas of the texture (e.g., 304) may be reduced to optimize the consistency of the detail for the rendered object that includes 2D texture 300 and mesh 400. To continue the example, the corresponding areas of the texture (e.g., 302) may not be reduced or instead enhanced to optimize the presentation of the rendered object that includes 2D texture 300 and mesh 400 by preserving the detail in 2D texture 300 for area 302. The data about the plurality of triangles for 402 and 404 as well as data about how the triangles for 402 and 404 are viewed or presented via a spectrum of viewpoints, data about portions 302 and 304 for 2D texture 300, and other data about the environment in which the rendered object that includes the 2D texture 300 and mesh 400 for the 3D object may be used to determine values or encoding parameters. The values or encoding parameters can be used to compress areas of the 2D texture 300 differently or apply filters which remove or preserve details in the 2D texture 300 to generate an optimized and consistent level of detail for the subsequent rendered object that includes the 2D texture 300 transformed onto or into the mesh 400 of the 3D object.

Figure 5:
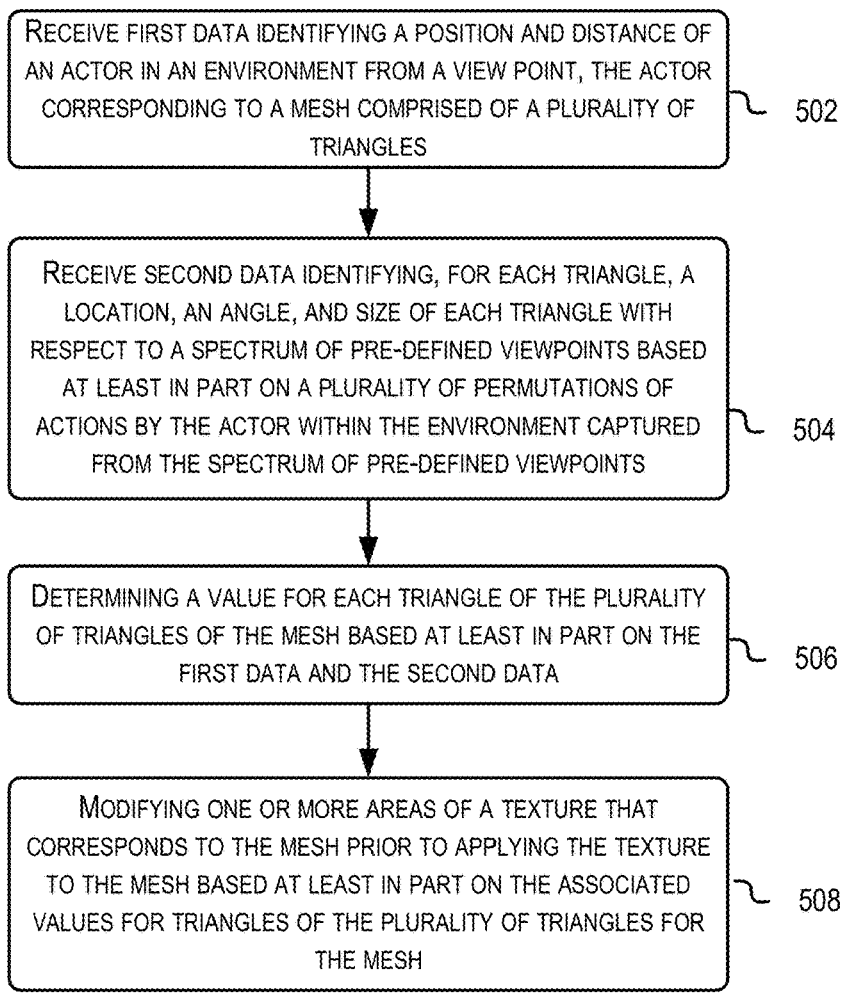
FIG. 5 illustrates a flow diagram for a texture modification feature, in accordance with embodiments.
Figure 6:
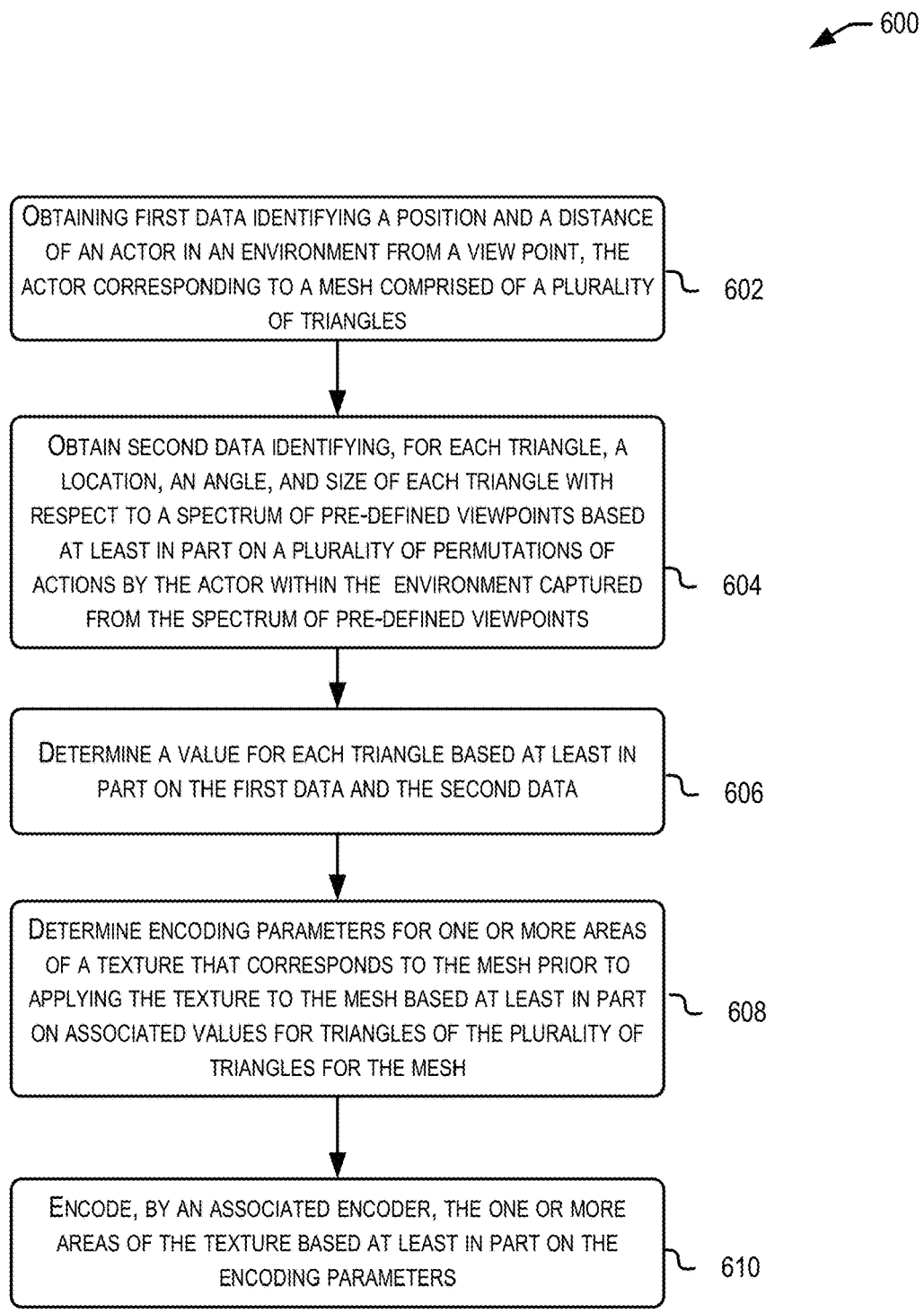
FIG. 6 illustrates a flow diagram for a texture modification feature, in accordance with embodiments.

FIGS. 5 and 6 illustrate example flow charts for texture modification features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium for example, in the form of a computer program including a plurality of instructions executable by one or more processors. The computer-readable storage medium may be non-transitory.

Figure 7:
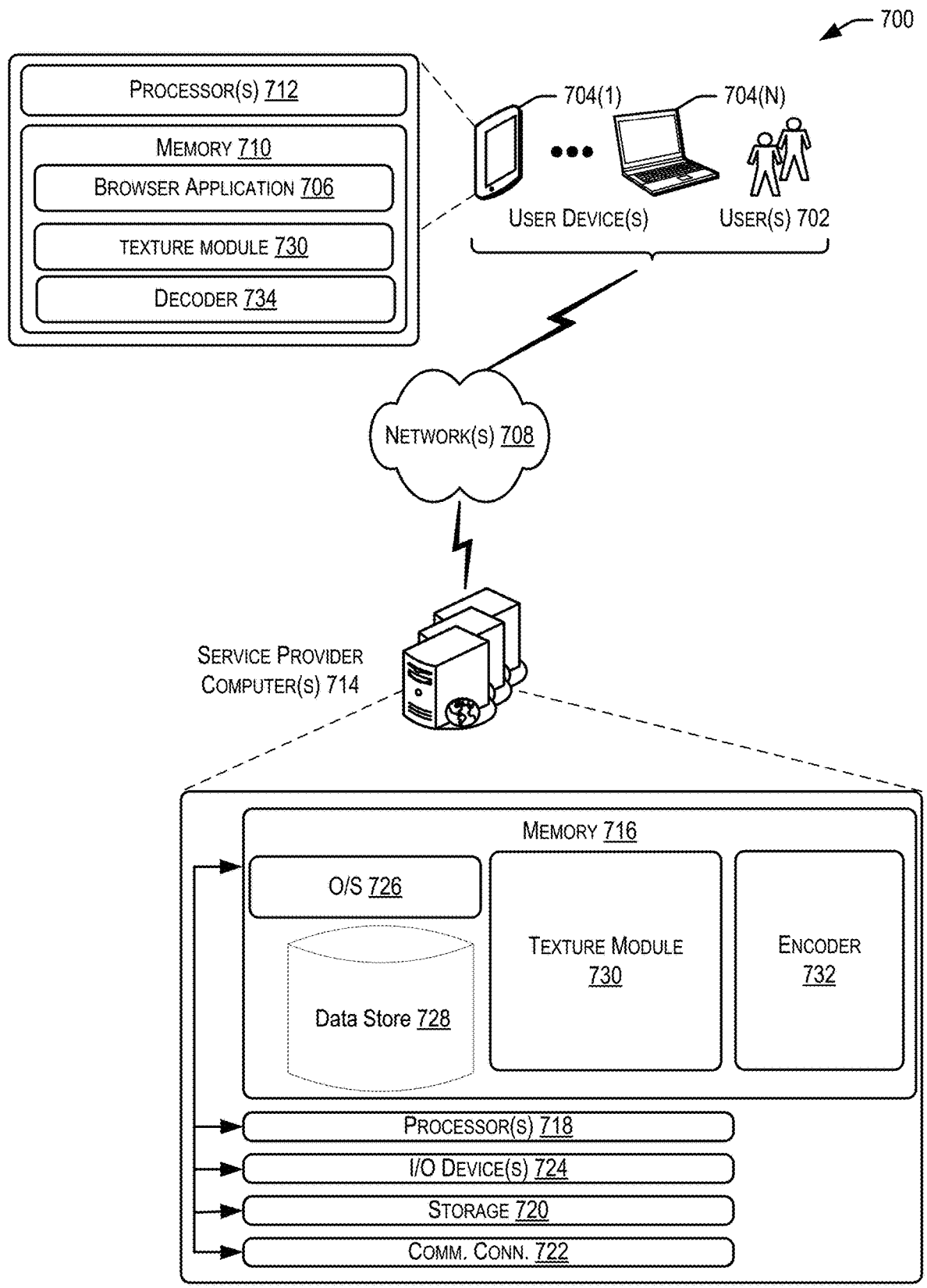
FIG. 7 depicts an illustrative example of a system or architecture for implementing a texture modification feature, in accordance with embodiments.

In some examples, service provider computers (service provider computers 714) utilizing at least the texture module 730 and encoder 732 of FIG. 7 may perform the processes 500 and 600 of FIGS. 5 and 6. In FIG. 5, the process 500 may include receiving first data identifying a position and distance of an actor (object) in an environment from a viewpoint at 502. In embodiments, the actor may correspond to a 3D mesh comprised of a plurality of triangles. The process 500 may include receiving second data that identifies, for each triangle, a location, an angle, and size of each triangle with respect to a spectrum of pre-defined viewpoints based at least in part on a plurality of permutations of actions by the actor within the environment captured from the spectrum of pre-defined viewpoints at 504. Other data may be received about the actor, the 3D mesh, and a corresponding texture. The other data may include a pixel frequency for each area of the corresponding texture, lighting conditions, color contrast, shadows, or other environmental information.

The process 500 may include determining a value for each triangle of the plurality of triangles of the mesh based at least in part on the first data and the second data at 506. In embodiments, the value for each triangle may represent a level of detail to optimize viewing of each triangle from a corresponding viewpoint of the spectrum of pre-defined viewpoints. In embodiments, the data for the texture, mesh, viewpoints, and environment may be received from an engine such as a game engine or animation engine. In accordance with at least one embodiment, the values may be weighted according to the first data and the second data or other data about the mesh, texture, viewpoints, or environment. For example, an area of a texture that is scaled larger and is viewed often via the spectrum of viewpoints may have a determined value weighted more in a texture budget when considering compression techniques or scaling algorithms to utilize for that area of the texture, or when modifying encoding parameters.

The values may also be weighted based on user input such as users associated with the content providers or engines. The process 500 may include modifying one or more areas of a texture that corresponds to the mesh prior to applying the texture to the mesh based at least in part on the associated values for triangles of the plurality of triangles for the mesh at 508. In embodiments, once the values are determined for the triangles, the areas of the texture can be modified according to a number of procedures. For example, encoding parameters for the texture may be modified which results in more or less compression when rendering the object that includes the texture and the mesh. Different compression techniques may be applied to certain areas of the texture based on the determined values such as by applying a lossy compression technique to areas of the texture with values that indicate that less detail is required, while applying a lossless compression technique to areas of the texture with values that indicate that more detail is required or should be preserved. Certain filters such as a low pass filter or a high pass filter may be applied to areas of the texture based on the determined values for the areas of the texture to reduce detail or increase detail. Particular scaling algorithms for rendering the object that includes the texture and mesh may be selected based on the values determined by the texture modification feature described herein.

The process 600 of FIG. 6 may include obtaining first data identifying a position and distance of an actor in an environment from a view point at 602. In embodiments, the actor (object) may correspond to a 3D mesh comprised of a plurality of triangles. The process 600 may include obtaining second data identifying, for each triangle, a location, an angle, and size of each triangle with respect to a spectrum of pre-defined viewpoints based at least in part on a plurality of permutations of actions by the actor within the environment captured from the spectrum of pre-defined viewpoints at 604. The process 600 may include determining a value for each triangle based at least in part on the first data and the second data at 606. The value may represent a level of detail to optimize viewing of each triangle from a corresponding viewpoint of the spectrum of pre-defined viewpoints.

In embodiments, optimizing viewing of each triangle may correspond to preserving or enhancing details (pixel frequency, density, etc.) for certain portions of a texture and correlated triangle for a rendered object or decreasing details for certain portions of the texture and correlated triangle for the rendered object. The process 600 may include determining encoding parameters for one or more areas of a texture that correspond to the mesh prior to applying the texture to the mesh based at least in part on associated values for triangles of the plurality of triangles for the mesh at 608. In embodiments, the texture may correspond to a 2D object and the mesh may correspond to a 3D object in the environment. In accordance with at least one embodiment, applying the texture to the mesh includes transforming the texture from the 2D object in a planar space to the 3D object in the environment. The process 600 may include encoding, by an associated encoder, the one or more areas of the texture based at least in part on the determined encoding parameters at 610. In accordance with at least one embodiment, the encoding parameters may further be based at least in part on a change of a geometric shape for each triangle of the plurality of triangles during transforming the texture to the mesh or based on the geometric shape of the triangles prior to transforming the texture to the mesh. In embodiments, the encoding parameters include the quantization parameters.

FIG. 7 depicts an illustrative example of a system or architecture 700 for implementing a texture modification feature, in accordance with embodiments. In architecture 700, one or more users 702 may utilize user computing devices 704(1)-(N) (collectively, user devices 704) to access a browser application 706 (e.g., a web browser) or a user interface (UI) accessible through the browser application 706, via one or more networks 708. The "browser application" 706 can be any browser control, native application, video player, or application that can access and display a network page, content, or other information. In some aspects, the browser application 706 may be hosted, managed, and/or provided by a computing resources service or service provider, such as by utilizing one or more service provider computers 714. The one or more service provider computers 714 may, in some examples, provide computing resources such as, but not limited to, client entities, low latency data storage, durable data storage, data access, management, virtualization, hosted-computing-system-based software solutions, electronic content performance management, online retailer item or service offerings, online content offerings, content generation, streaming content, video game content, etc. The one or more service provider computers 714 may also be operable to provide web or network hosting, computer application development, and/or implementation platforms, combinations of the foregoing, or the like to the one or more users 702.

In one illustrative configuration, the user devices 704 may include at least one memory 710 and one or more processing units or processor(s) 712. The processor(s) 712 may be implemented as appropriate in hardware, computer-executable instructions, firmware, or combinations thereof. Computer-executable instruction or firmware implementations of the processor(s) 712 may include computer-executable or machine-executable instructions written in any suitable programming language to perform the various functions described. The user devices 704 may also include geo-location devices (e.g., GPS device or the like) for providing and/or recording geographic location information associated with the user devices 704.

The memory 710 may store program instructions that are loadable and executable on the processor(s) 712, as well as data generated during the execution of these programs. Depending on the configuration and type of user device 704, the memory 710 may be volatile (such as random access memory (RAM)) and/or non-volatile (such as read-only memory (ROM), flash memory, etc.). The user device 704 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 710 may include multiple different types of memory, such as static random access memory (SRAM), dynamic random access memory (DRAM), or ROM.

Turning to the components of the memory 710 in more detail, the memory 710 may include an operating system and one or more application programs or services for implementing the features disclosed herein via the browser application 706 or dedicated applications (e.g., smart phone applications, tablet applications, content applications, etc.). The browser application 706 may be configured to receive, store, and/or display a website, a link to an online retailer, content such as content provided by a content provider, streaming content, or other interface for interacting with the one or more service provider computers 714 such as displaying content generated and encoded by the one or more service provider computers 714. Additionally, the memory 716 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 702 provided response to a security question or a geographic location obtained by the user device 704. In embodiments, the user device 704 may be configured to perform the features of the texture modification feature discussed with reference to FIGS. 1-6. The memory 710 may include texture module 730 configured to perform the same functions as texture module 730 of the one or more service provider computers 714 and/or communicate with the service provider computers 714 to decode, with decoder 734, content provided by the one or more service provider computers 714 and present to the user 702 the decoded content via user device 704 and browser application 706. The decoder 734 may be configured to decode encoded content, handle playback logic to display or present content via user device 704 and browser application 706, and store decoded content.

In some examples, the networks 708 may include any one or a combination of many different types of networks, such as cable networks, the Internet, wireless networks, cellular networks and other private and/or public networks. While the illustrated example represents the users 702 accessing the browser application 706 over the networks 708, the described techniques may equally apply in instances where the users 702 interact with the one or more service provider computers (service provider computers) 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 706 may allow the users 702 to interact with the one or more service provider computers 714, such as to access content like webpages or network pages. The one or more service provider computers 714, perhaps arranged in a cluster of servers or as a server farm, may host the browser application 706 and/or cloud-based software services. Other server architectures may also be used to host the browser application 706 and/or cloud-based software services. The browser application 706 may be capable of handling requests from many users 702 and serving, in response, various user interfaces that can be rendered at the user devices 704 such as, but not limited to, a webpage, a website, network site, a network page, items or services offered by an online retailer, responses to queries for items or services provided by users 702, or content generated by the service provider computers 714 or other content providers as described herein. The browser application 706 can interact with any type of website or network site that supports user interaction, including social networking sites, electronic retailers, informational sites, blog sites, search engine sites, news and entertainment sites, and so forth. The described techniques can similarly be implemented outside of the browser application 706, such as with other applications running on the user device 704.

The one or more service provider computers 714 may be any type of computing device such as, but not limited to, a mobile phone, a smart phone, a personal digital assistant (PDA), a laptop computer, a desktop computer, a server computer, electronic book (e-book) reader, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the one or more service provider computers 714 may be in communication with the user device 704 via the networks 708, or via other network connections. The one or more service provider computers 714 may include one or more servers, perhaps arranged in a cluster or as individual servers not associated with one another. The one or more service provider computers 714 may be in communication with one or more third party computers, one or more sensors, or one or more computer systems (not pictured) via networks 708. The one or more service provider computers 714 that host the browser application 706 may obtain and provide data to third party computers or one or more computer systems via networks 708 in accordance with embodiments described herein.

In one illustrative configuration, the one or more service provider computers 714 may include at least one memory 716 and one or more processing units or processors(s) 718. The processor(s) 718 may be implemented as appropriate in hardware, computer-executable instructions, firmware, or combinations thereof. Computer-executable instruction or firmware implementations of the processor(s) 718 may include computer-executable or machine-executable instructions written in any suitable programming language to perform the various functions described. The memory 716 may store program instructions that are loadable and executable on the processor(s) 718, as well as data generated during the execution of these programs. Depending on the configuration and type of the one or more service provider computers 714, the memory 716 may be volatile (such as RAM) and/or non-volatile (such as ROM, flash memory, etc.). The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of computer storage media. Additional types of computer storage media that may be present in the one or more service provider computers 714 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium, which can be used to store the desired information and which can be accessed by the one or more service provider computers 714. Combinations of any of the above should also be included within the scope of computer-readable media.

The one or more service provider computers 714 may also contain communication connection(s) 722 that allow the one or more service provider computers 714 to communicate with a stored database, another computing device or server, user terminals and/or other devices on the networks 708. The one or more service provider computers 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728 and/or one or more application programs, services, or other software modules, which are generally executed by a processor (e.g., the processors 712 and/or 718) for implementing the features disclosed herein.

An example module is shown in FIG. 7, but functions and embodiments described herein can utilize a subset of the features provided by the module and/or additional functions can be provided. Additionally, while the example module will now be briefly discussed with regard to FIG. 7, further specific details regarding the example module is provided herein in the descriptions of the Figures.

As an example module of memory 716, a texture module 730 can be provided for obtaining or receiving data about meshes, textures, environments, and actors associated with the meshes, textures, and environments. The texture module 730 may be configured to utilize the data to generate values for each triangle of a plurality of triangles of the mesh of an object or actor in an environment. The value may represent the importance of the triangle to a viewer from a spectrum of viewpoints relative to its location and respective of the location and importance of other triangles in the mesh. The values of each triangle can be used by the texture module 730 to optimize the level of detail in a final rendered mesh and applied texture. For example, the texture module 730 may be configured to modify a texture, prior to applying the texture to the mesh. The texture module 730 may be configured to smooth certain areas of the texture that correspond to particular triangles of the mesh by using lossy compression, lossless compression, or other compression techniques. In embodiments, the texture module 730 may implement and train a machine learning model to generate the values for triangles of a mesh using the data about the meshes, textures, environments, actors, viewpoints etc. The machine learning algorithm may weight certain values more than other based on the data which can result in different modifications to the texture such as more or less compression, scaling, or other suitable techniques for modifying a 2D texture. In accordance with at least one embodiment, the texture module 730 may be configured to determine encoding parameters for one or more areas of a texture that correspond to the mesh prior to applying the texture to the mesh. The texture may be a 2D object while the mesh is a 3D object in an environment. Applying the texture to the mesh may include transforming the 2D object in a planar space to a 3D object in the environment. The texture module 730 and encoder 732 may be configured to encode the one or more areas of the texture based on the determined encoding parameters. The texture module 730 may receive or obtain the data for the meshes and textures from a game engine, animation engine, or other application of a user device 704, the service provider computers 714, or from one or more third party computers (not pictured). In embodiments, the texture module 730 may obtain the data for the meshes and textures from a graphics processing unit (GPU) of the user device, the service provider computers 714, or the third party computers. In accordance with at least one embodiment, the texture module 730 may communicate with one or more computer systems (not pictured) to perform services associated with the features described herein including receiving content, receiving or obtaining data about the content, modifying the content (e.g., textures or meshes), generating and/or modifying encoding parameters for the content, transmitting modified content, or generating modified content.

Figure 8:
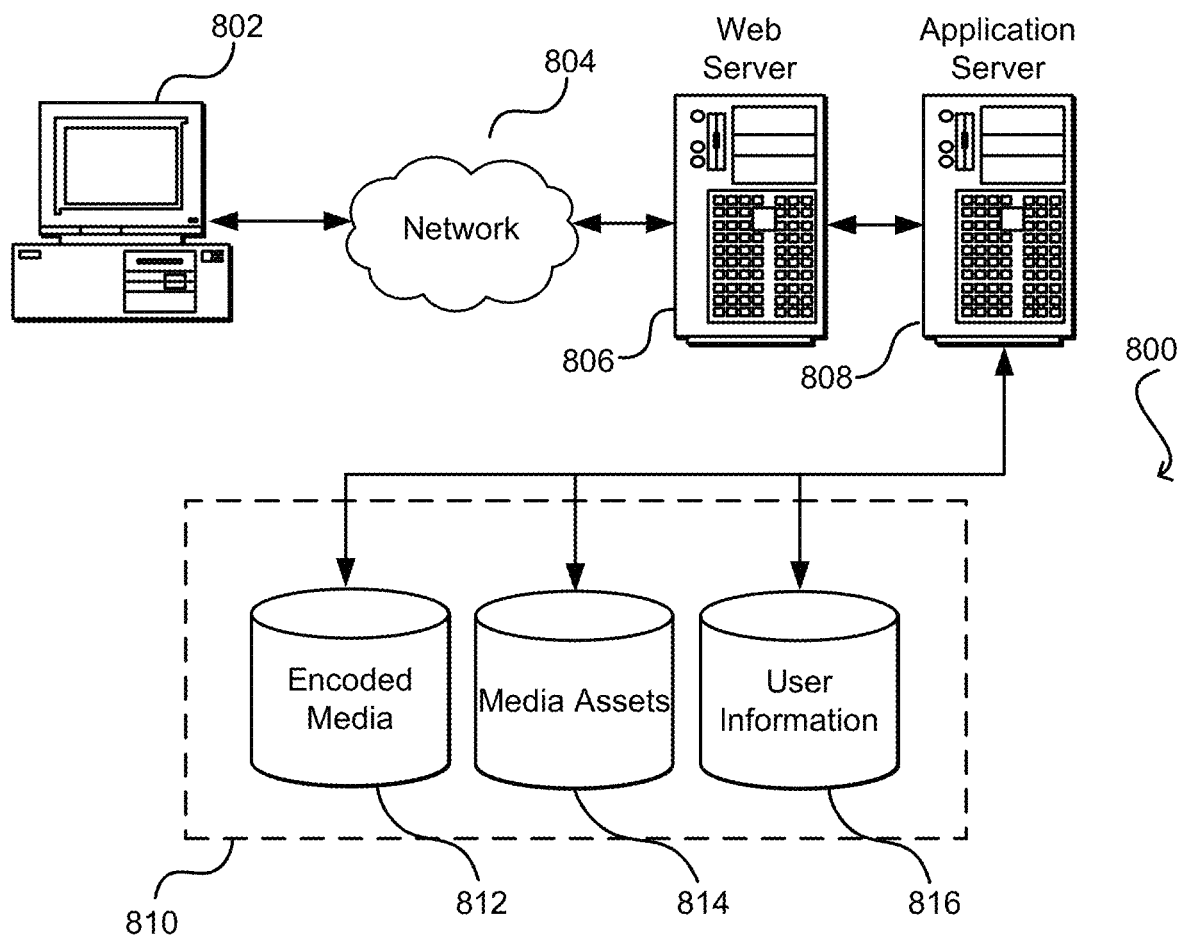
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein. In embodiments, the client device 802 may implement a decoder while the web server 806 and application server 808 may implement an encoder.

The data store 810 can include several separate data tables, databases or other data storage mechanisms and media for storing data relating to a particular aspect. For example, the data store illustrated includes mechanisms for storing encoded media 812 and user information 816, which can be used to serve content for the production side including encoding media prior to transmitting the media, via network 804, to client device 802 for decoding and presentation. The data store also is shown to include a mechanism for storing media assets 814, which can be used for reporting, analysis, or other such purposes such as modifying a texture, applying one or more compression techniques, or modifying encoding parameters for media content. The media assets 814 may include textures, meshes, environments, objects, and other suitable information for rendering a scene for media content including a video game, streaming content, or animation. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environtext in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
  receiving, by a computer system and from a game engine, first data identifying a position and a distance of an actor in an environment from a view point, the actor corresponding to a mesh comprised of a plurality of triangles;

receiving, by the computer system and from the game engine, second data identifying, for each triangle of the plurality of triangles of the mesh, a location, an angle, and size of each triangle with respect to a spectrum of pre-defined viewpoints based at least in part on a plurality of permutations of actions by the actor within the environment captured from the spectrum of pre-defined viewpoints;

training, by the computer system, a machine learning algorithm using the first data and the second data;

determining, by the computer system, a value for each triangle of the plurality of triangles of the mesh based at least in part on the trained machine learning algorithm using the first data and the second data, the value representing a level of detail to optimize viewing of each triangle from a corresponding viewpoint of the spectrum of pre-defined viewpoints; and modifying, by the computer system, one or more areas of a texture that corresponds to the mesh prior to applying the texture to the mesh based at least in part on associated values for triangles of the plurality of triangles for the mesh.

2. The computer-implemented method of claim 1, wherein the level of detail includes a pixel frequency for each triangle of the plurality of triangles of the mesh.

3. The computer-implemented method of claim 1, wherein modifying the one or more areas of the texture that corresponds to the mesh includes applying a lossy compression to the texture based at least in part on the associated values for the triangles for the mesh.

4. The computer-implemented method of claim 1, further comprising transmitting, by the computer system and to a user device, the actor with the modified texture applied to the mesh.

5. The computer-implemented method of claim 1, wherein the first data and the second data are received in response to a query generated by the computer system and transmitted to the game engine.

6. The computer-implemented method of claim 1, wherein the value for each triangle of the plurality of triangles of the mesh is weighted based at least in part on the second data.

7. The computer-implemented method of claim 1, wherein the value for each triangle of the plurality of triangles of the mesh is weighted based at least in part on input received from a user associated with the game engine.

8. A non-transitory computer-readable storage medium storing computer-executable instructions that, when executed by a computer system, configure the computer system to perform operations comprising:

obtaining first data identifying a position and a distance of an actor in an environment from a view point, the actor corresponding to a mesh comprised of a plurality of triangles;

obtaining second data identifying, for each triangle of the plurality of triangles of the mesh, a location, an angle, and size of each triangle with respect to a spectrum of pre-defined viewpoints based at least in part on a plurality of permutations of actions by the actor within the environment captured from the spectrum of pre-defined viewpoints;

determining a value for each triangle of the plurality of triangles of the mesh based at least in part on the first data and the second data, the value representing a level of detail to optimize viewing of each triangle from a corresponding viewpoint of the spectrum of pre-defined viewpoints;

determining encoding parameters for one or more areas of a texture that corresponds to the mesh prior to applying the texture to the mesh based at least in part on associated values for triangles of the plurality of triangles for the mesh, wherein the texture is a two-dimensional object, the mesh is a three-dimensional object in the environment, and wherein applying the texture to the mesh includes transforming the texture from the two-dimensional object in a planar space to the three-dimensional object in the environment; and encoding, by an associated encoder, the one or more areas of the texture based at least in part on the corresponding encoding parameters.

9. The non-transitory computer-readable storage medium of claim 8, wherein the second data further identifies a geometric shape for each triangle of the plurality of triangles of the mesh.

10. The non-transitory computer-readable storage medium of claim 9, wherein determining the encoding parameters for the one or more areas of the texture is further based at least in part a change of the geometric shape for each triangle that corresponds to the one or more areas of the texture.

11. The non-transitory computer-readable storage medium of claim 8, wherein the encoding parameters includes quantization parameters for the one or more areas of the texture.

12. A computer system comprising:

a memory configured to store computer-executable instructions; and a processor in communication with the memory configured to execute the computer-executable instructions to at least:

obtain first data identifying a position and a distance of an actor in an environment from a view point, the actor corresponding to a mesh comprised of a plurality of triangles;

obtain second data identifying, for each triangle of the plurality of triangles of the mesh, a location, an angle, and size of each triangle with respect to a spectrum of pre-defined viewpoints based at least in part on a plurality of permutations of actions by the actor within the environment captured from the spectrum of pre-defined viewpoints;

train a machine learning algorithm using the first data and the second data;

determine a value for each triangle of the plurality of triangles of the mesh based at least in part on the trained machine learning algorithm using the first data and the second data, the value representing a level of detail to optimize viewing of each triangle of the actor from a corresponding viewpoint of the spectrum of pre-defined viewpoints; and modify one or more areas of a texture that corresponds to the mesh prior to applying the texture to the mesh based at least in part on associated values for triangles of the plurality of triangles for the mesh.

13. The computer system of claim 12, wherein the second data further identifies, for each triangle, a shadow, a light source with respect to the spectrum of pre-defined viewpoints, and a color contrast.

14. The computer system of claim 12, wherein modifying the one or more areas of the texture includes applying a low pass filter to the one or more areas based at least in part on the determined values for each triangle that corresponds to the one or more areas.

15. The computer system of claim 12, wherein applying the modified texture to the mesh includes utilizing a scaling algorithm that further uses the determined values for each triangle that corresponds to the one or more areas.

16. The computer system of claim 12, wherein the instructions further cause the computer system to receive third data that identifies a modification to the mesh of the actor.

17. The computer system of claim 16, wherein the instructions further cause the computer system to:
- obtain updated first data identifying the position and the distance of the actor in the environment based at least in part on the third data;
- obtain updated second data identifying, for each triangle of the plurality of triangles of the mesh based at least in part on the third data; and
- determine the value for each triangle of the plurality of triangles of the mesh based at least in part on the updated first data, the updated second data, and the third data.

18. The computer system of claim 12, wherein the first data and the second data are obtained from a graphics processing unit (GPU) of the computer system.

* * * * *